(12) United States Patent
Ogura

(10) Patent No.: US 6,219,455 B1
(45) Date of Patent: Apr. 17, 2001

(54) METHOD AND APPARATUS FOR DETECTING MOTION VECTORS

(75) Inventor: Eiji Ogura, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/082,230

(22) Filed: May 20, 1998

(30) Foreign Application Priority Data

May 22, 1997 (JP) ................................................. 9-131953

(51) Int. Cl.[7] .......................................................... G06K 9/36
(52) U.S. Cl. ................................................................ 382/236
(58) Field of Search ..................................... 382/232, 236, 382/238, 240, 248, 250; 358/432, 433; 348/384, 394, 395, 400–404, 407–416, 420, 421, 425, 430, 431, 448, 580, 583, 699

(56) References Cited

U.S. PATENT DOCUMENTS

| | | | |
|---|---|---|---|
| Re. 35,093 | * 11/1995 | Wang et al. | 348/413 |
| 4,432,009 | * 2/1984 | Reitmeier et al. | 348/580 |
| 4,603,350 | * 7/1986 | Arbeiter et al. | 348/448 |
| 5,193,004 | * 3/1993 | Wang et al. | 348/413 |

* cited by examiner

*Primary Examiner*—Jose L. Couso
(74) *Attorney, Agent, or Firm*—Frommer Lawrence & Haug, LLP; William S. Frommer; Bruno Polito

(57) ABSTRACT

A motion vector detecting apparatus has a first storage unit through a fourth storage unit. The first storage unit stores top-field pixel data of odd-numbered rows or odd-numbered columns. The second storage unit stores top-field pixel data of even-numbered rows or even-numbered columns. The third storage unit stores bottom-field pixel data of odd-numbered rows or odd-numbered columns. The fourth storage unit stores bottom-field pixel data of even-numbered rows or even-numbered columns. The selector selects pixel data of a predetermined search block from the pixel data stored in the first storage unit through the fourth storage unit. A fifth storage unit stores at least interleaved pixel data among pixel data of the reference block. A first calculator performs a calculation to obtain the difference between the pixel data of the search block selected by the selector and the pixel data of the reference block stored in the fifth storage unit. A second calculator performs a calculation to obtain the sum of the differences within each search block. A detector detects the search block having the minimum value of the calculations performed by the second calculator. This prevents pipeline processing for transferring pixel data and reduces the power consumption.

8 Claims, 15 Drawing Sheets

| | | T0 | T1 | T2 | T3 | T4 | T5 | T6 | T7 | T8 | T9 |
|---|---|---|---|---|---|---|---|---|---|---|---|
| ADDER 54 | SUBTRACTER 46 t (0,0) | t0 | b0 | t1 | b1 | t2 | t4 | b4 | t5 | b5 | t6 |
| | SUBTRACTER 47 t (1,0) | t1 | b1 | t2 | b2 | t3 | t5 | b5 | t6 | b6 | t7 |
| | SUBTRACTER 48 t (0,2) | t8 | b8 | t9 | b9 | t10 | t12 | b12 | t13 | b13 | t14 |
| | SUBTRACTER 49 t (1,2) | t9 | b9 | t10 | b10 | t11 | t13 | b13 | t14 | b14 | t15 |
| ADDER 55 | SUBTRACTER 50 b (0,0) | b0 | t1 | b1 | t2 | b2 | b4 | t5 | b5 | t6 | b6 |
| | SUBTRACTER 51 b (1,0) | b1 | t2 | b2 | t3 | b3 | b5 | t6 | b6 | t7 | b7 |
| | SUBTRACTER 52 b (0,2) | b8 | t9 | b9 | t10 | b10 | b12 | t13 | b13 | t14 | b14 |
| | SUBTRACTER 53 b (1,2) | b9 | t10 | b10 | t11 | b11 | b13 | t14 | b14 | t15 | b15 |

| | | T10 | T11 | T12 | T13 | T14 | T15 | T16 | T17 | T18 | T19 |
|---|---|---|---|---|---|---|---|---|---|---|---|
| ADDER 54 | SUBTRACTER 46 t (0,0) | t8 | t9 | t10 | b9 | t10 | t12 | b12 | t13 | b13 | t14 |
| | SUBTRACTER 47 t (1,0) | t9 | t10 | t17 | b10 | t11 | t13 | b13 | t14 | b14 | t15 |
| | SUBTRACTER 48 t (0,2) | t16 | b16 | t17 | b17 | t18 | t19 | t20 | b20 | t21 | b21 | t22 |
| | SUBTRACTER 49 t (1,2) | t17 | b17 | t18 | b18 | t19 | t20 | t21 | b21 | t22 | b22 | t23 |
| ADDER 55 | SUBTRACTER 50 b (0,0) | b8 | b9 | b10 | b11 | b12 | b13 | b14 | b15 |
| | SUBTRACTER 51 b (1,0) | b9 | b10 | b17 | t11 | b12 | b13 | b14 | b15 | b16 |
| | SUBTRACTER 52 b (0,2) | b16 | b17 | b18 | t19 | b20 | b21 | b22 | b23 |
| | SUBTRACTER 53 b (1,2) | b17 | b18 | b19 | b20 | b21 | b22 | b23 | b24 |

42

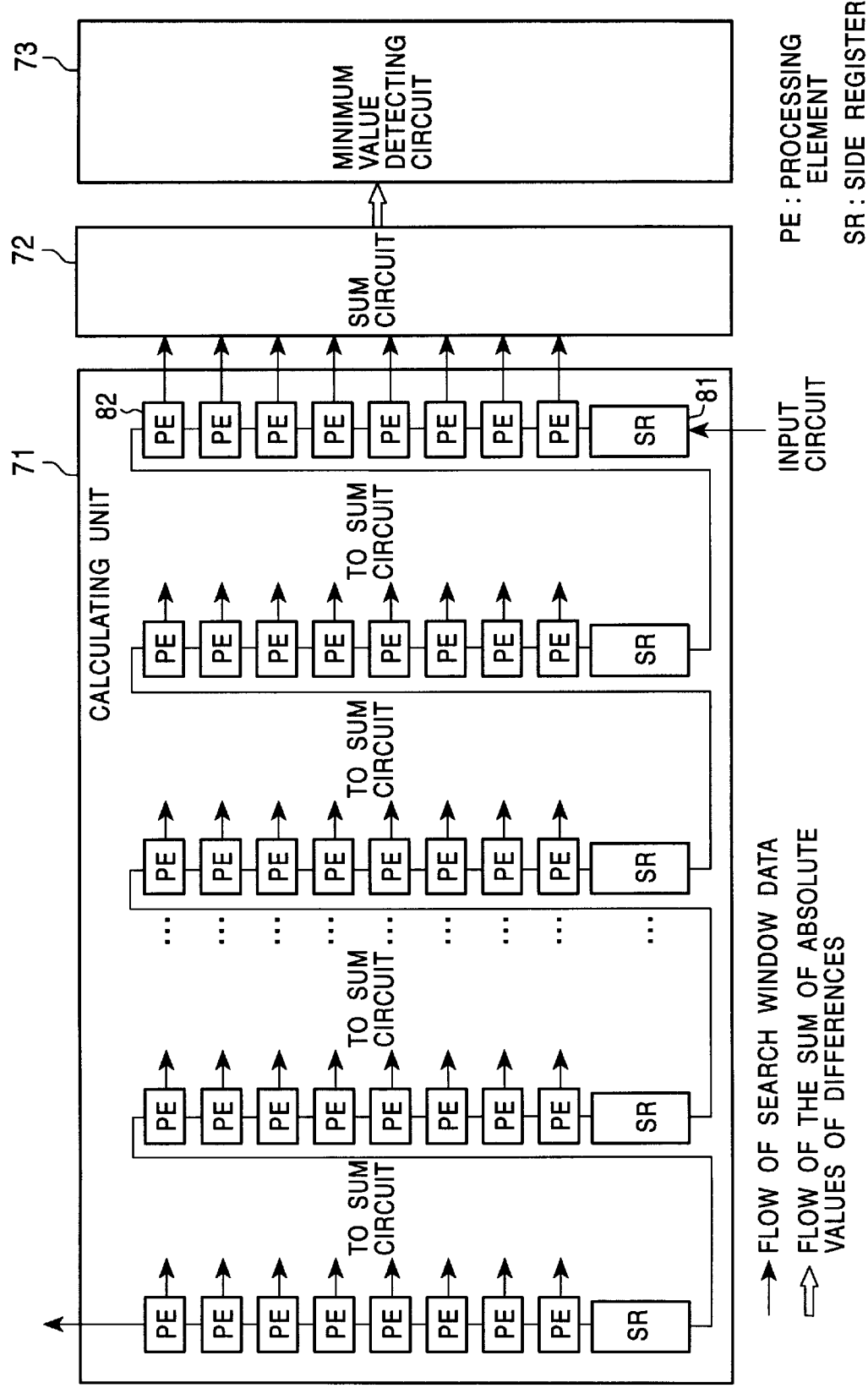

METHOD AND APPARATUS FOR DETECTING MOTION VECTORS

BACKGROUND OF THE INVENTION

1. Field of the Invention

The present invention generally relates to a method and an apparatus for detecting motion vectors. More particularly, the invention relates to a method and an apparatus for detecting motion vectors in which motion vectors are detected with low power consumption.

2. Description of the Related Art

According to the Moving Picture Experts Group (MPEG) of the International Organization for Standardization/International Electrotechnical Commission, Joint Technical Committee 1/Sub Committee 29) (ISO/IEC JTC1/SC29), moving picture data is compressed by detecting a motion vector. In other words, it is necessary to detect a motion vector in order to perform the above type of compression.

FIG. 15 illustrates an example of a known motion vector detecting apparatus. The configuration of this apparatus is disclosed in pages 61 to 68 of the Technical Report of IEICE ICD93-80 (1993-08) as "half-pel-precision motion-vector detecting LSI in compliance with CCIR601".

In this example, search window data (pixel data within a search area) is supplied to a calculating unit 71 from an input circuit (not shown). The pixel data is shifted by columns of a reference block from a side register (SR) 81 to a processing element (PE) 82. Each PE 82 stores pixel data for one search block. Each PE 82 also has predetermined reference block data (template data) for detecting a motion vector. The PE 82 then calculates the difference between the predetermined reference block pixel data and the stored search block pixel data and outputs it to a sum circuit 72. One stage of cascade-connected PEs 82 sequentially transfers each column of pixel data of a search block (reference block) to the subsequent stage of PEs 82 in synchronization with the clock. Similarly, each stage of PEs 82 transfers pixel data. Then, upon inputting a new column of data, the PE 82 again calculates the difference between the reference block pixel data and the search block pixel data and outputs it to the sum circuit 72.

The sum circuit 72 obtains the sum of the absolute values of the differences between the reference block pixel data and the search block pixel data in each search block so as to output the sum to a minimum value detecting circuit 73. The minimum value detecting circuit 73 then detects the position of the search block within the search window obtained when the sum circuit 72 outputs the minimum value.

In this manner, according to the above known type of motion vector detecting apparatus, pixel data is sequentially transferred from one stage of PEs to a subsequent stage of PEs, i.e., pipeline processing is performed to transfer pixel data. Thus, data is overwritten in most of the PEs whenever each row of pixel data is transferred in each clock, causing a current to flow and increasing the power consumption.

SUMMARY OF THE INVENTION

Accordingly, in view of the above background, it is an object of the present invention to suppress the transferring of pixel data within a search area (search data) by interleaving the pixel data in the horizontal direction or in the vertical direction, thereby inhibiting the consumption of a large amount of power.

In order to achieve the above object, according to one aspect of the present invention, there is provided a motion vector detecting apparatus including a first storage unit for storing top-field pixel data of odd-numbered rows or odd-numbered columns among pixel data within a search area. A second storage unit stores top-field pixel data of even-numbered rows or even-numbered columns among pixel data within a search area. A third storage unit stores bottom-field pixel data of odd-numbered rows or odd-numbered columns among pixel data within a search area. A fourth storage unit stores bottom-field pixel data of even-numbered rows or even-numbered columns among pixel data within a search area. A selector selects pixel data of a predetermined search block from the pixel data stored in the first storage unit through the fourth storage unit. A fifth storage unit stores at least interleaved pixel data among pixel data of a reference block. A first calculator performs a calculation to obtain a difference between the pixel data of the search block selected by the selector and the pixel data of the reference block stored in the fifth storage unit. A second calculator performs a calculation to obtain a sum of the differences within each of the search blocks obtained by the first calculator. A detector detects a search block corresponding to a minimum value of the calculations performed by the second calculator.

According to another aspect of the present invention, there is provided a motion vector detecting method including the following steps. In a first storage step, top-field pixel data of odd-numbered rows or odd-numbered columns among pixel data within a search area is stored in a first storage unit. In a second storage step, top-field pixel data of even-numbered rows or even-numbered columns among pixel data within a search area is stored in a second storage unit. In a third storage step, bottom-field pixel data of odd-numbered rows or odd-numbered columns among pixel data within a search area is stored in a third storage unit. In a fourth storage step, bottom-field pixel data of even-numbered rows or even-numbered columns among pixel data within a search area is stored in a fourth storage unit. In a selection step, pixel data of a predetermined search block is selected from the pixel data stored in the first storage unit through the fourth storage unit. In a fifth storage step, at least interleaved pixel data among pixel data of a reference block is stored in a fifth storage unit. In a first calculation step, a calculation is performed to obtain a difference between the pixel data of the selected search block and the pixel data of the reference block stored in the fifth storage unit. In a second calculation step, a calculation is performed to obtain a sum of the differences within each of the search blocks obtained by the first calculation step. In a detection step, a search block corresponding to a minimum value of the calculations performed by the second calculation step is detected.

BRIEF DESCRIPTION OF THE DRAWINGS

FIG. 10 illustrates the transferring of pixel data in the motion detecting circuit shown in FIG. 2;

FIG. 15 is a block diagram illustrating an example of the configuration of a known motion vector detecting circuit.

DESCRIPTION OF THE PREFERRED EMBODIMENT

An embodiment of the present invention is described below with reference to the drawings.

Figure 1:
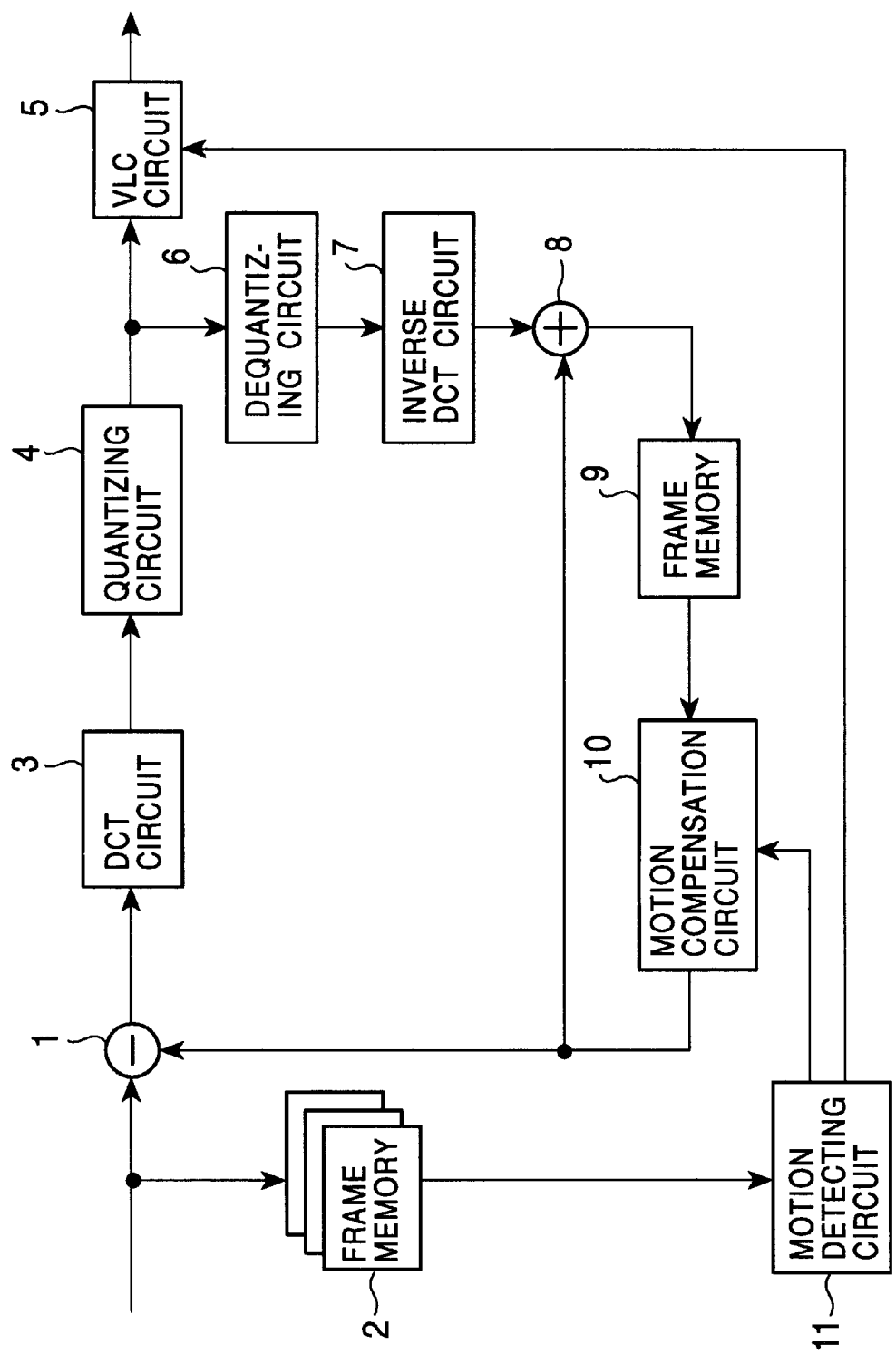
FIG. 1 is a block diagram illustrating the configuration of an image compressing unit formed by application of an embodiment of the present invention.

FIG. 1 illustrates the configuration of an image compressing unit formed by application of the motion vector detecting apparatus of the present invention. Image data is input into a subtracter 1 to calculate the difference between the image data and predictive image data supplied from a motion compensation circuit 10. The calculated difference data is then supplied to a discrete cosine transform (DCT) circuit 3. The DCT circuit 3 performs DCT on the input data and outputs the resulting data to a quantizing circuit 4. The quantizing circuit 4 then quantizes the input DCT coefficient and outputs the quantized data to a variable length code (VLC) circuit 5 and a dequantizing circuit 6. The VLC circuit 5 transforms the quantized data input from the quantizing circuit 4 into a VLC and transmits it to a transmission channel (not shown).

The dequantizing circuit 6 dequantizes the quantized data input from the quantizing circuit 4 and outputs the dequantized DCT coefficient to an inverse DCT circuit 7.

The inverse DCT circuit 7 then performs inverse DCT on the DCT coefficient input from the dequantizing circuit 6 and outputs it to an adder 8. The adder 8 adds the predictive image data input from the motion compensation circuit 10 to the difference data supplied from the inverse DCT circuit 7, thereby reproducing the original data. The reproduced original data is further supplied to a frame memory 9 and stored therein.

The image data read from the frame memory 9 is motion-compensated in the motion compensation circuit 10 and then supplied to the subtracter 1 and to the adder 8 as predictive image data.

Meanwhile, the input image data is supplied to a frame memory 2 and stored therein. The image data is appropriately read from the frame memory 2 and supplied to a motion detecting circuit 11, thereby detecting a motion vector. The detected motion vector is fed to the motion compensation circuit 10 and also to the VLC circuit 5 in which the motion vector is transformed into a VLC.

The operation of the above-described image compressing unit is now described. The input image data is supplied to the subtracter 1. Also supplied to the subtracter 1 is predictive image data which has been read from the frame memory 9 and then motion-compensated in the motion compensation circuit 10 in accordance with the motion vector. The subtracter 1 then subtracts the predictive image data from the input image data and outputs the resulting difference data to the DCT circuit 3. The DCT circuit 3 then performs DCT on the input difference data and outputs the resulting data to the quantizing circuit 4. The quantizing circuit 4 quantizes the input DCT coefficient and outputs the quantized data to the dequantizing circuit 6 and also to the VLC circuit 5. The VLC circuit 5 transforms the input quantized data to a VLC and outputs it.

The dequantizing circuit 6 dequantizes the quantized data output from the quantized circuit 4 in order to locally decode the quantized data and outputs the dequantized data to the inverse DCT circuit 7. The inverse DCT circuit 7 performs inverse DCT on the dequantized DCT coefficient to reproduce the original difference data, which is then output to the adder 8. Also supplied to the adder 8 is the predictive image data output from the motion compensation circuit 10, to which the difference data output from the inverse DCT circuit 7 is added, thereby reproducing the original image data. The reproduced image data is then fed to the frame memory 9 and stored therein.

The motion detecting circuit 11 suitably reads a predetermined field of image data stored in the frame memory 2 and detects a motion vector, which is then output to the motion compensation circuit 10 and to the VLC circuit 5. The motion compensation circuit 10 performs motion compensation on the image data read from the frame memory 9 in accordance with the motion vector so as to generate predictive image data, which is then output to the subtracter 1 and to the adder 8. In the meantime, the VLC circuit 5 transforms the input motion vector into a VLC and outputs it.

Figure 2:
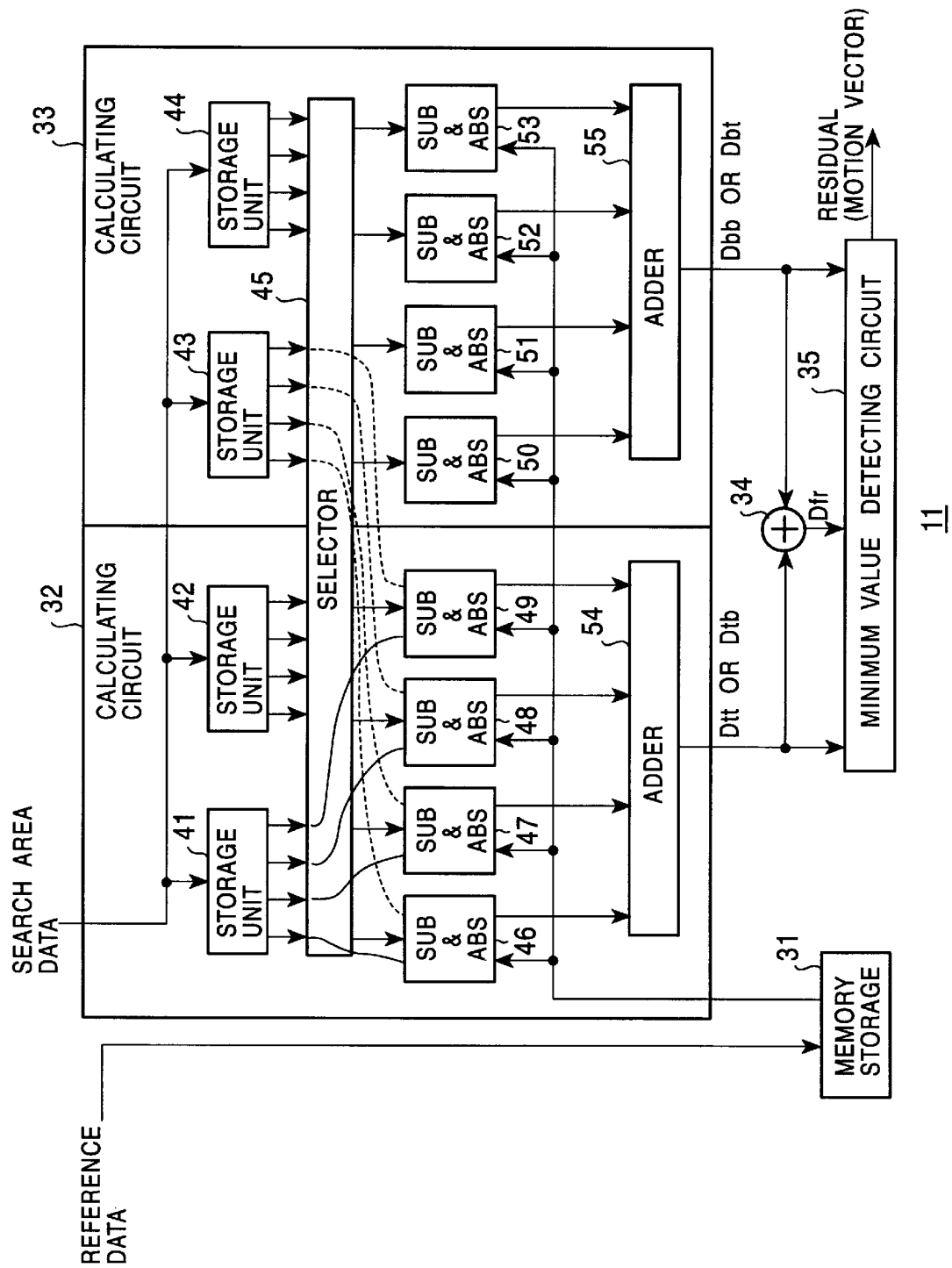
FIG. 2 is a block diagram illustrating the configuration of the motion detecting circuit shown in FIG. 1.

FIG. 2 illustrates the configuration of the motion detecting circuit 11. The pixel data within a search area used for detecting a motion vector is supplied to storage units 41 through 44 and stored therein. In this embodiment, the search area is, as shown in FIG. 3, formed of 8×8 pixels, among which eight pixels are suitably stored in each of the storage units 41 through 44.

Figure 4:
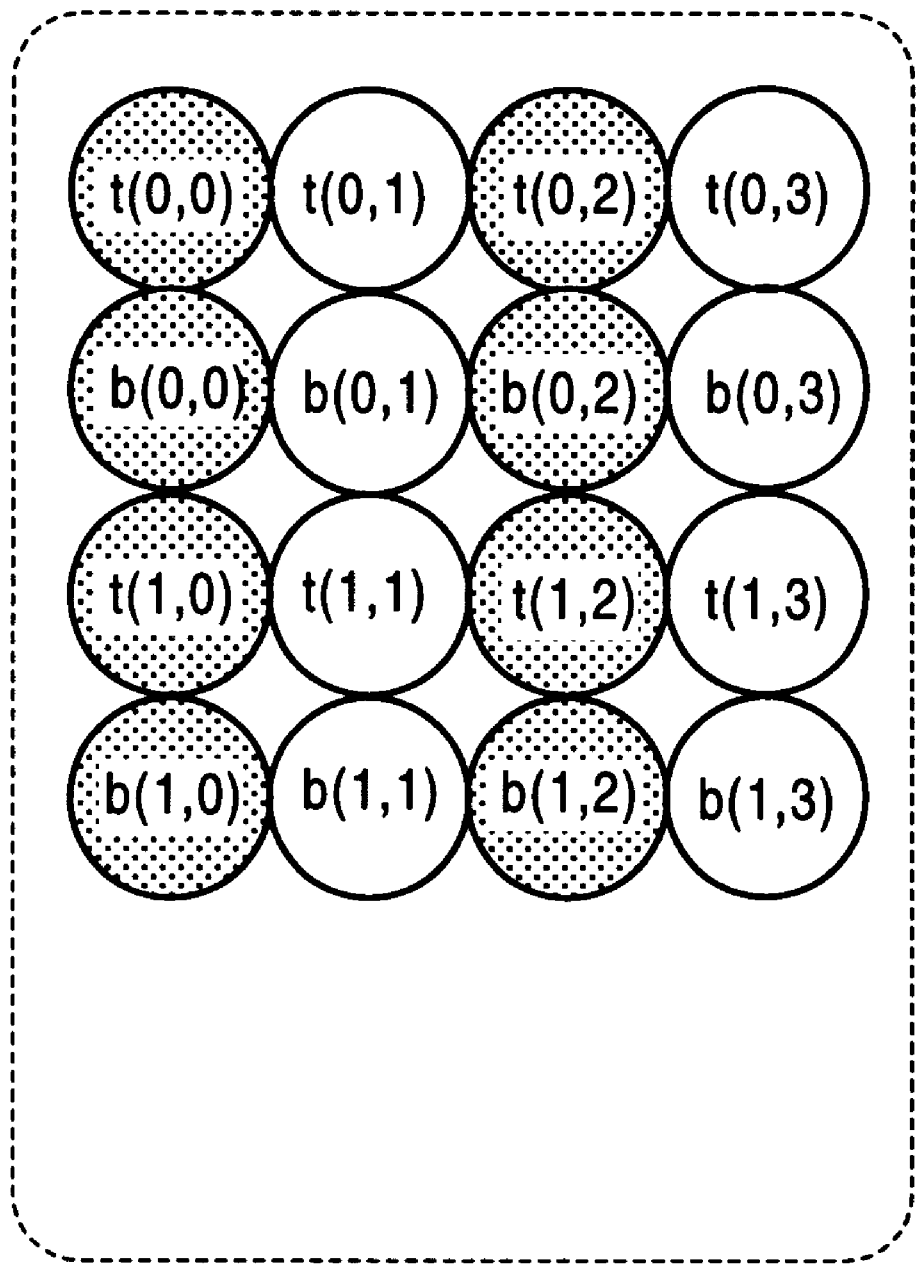
FIG. 4 illustrates one example of the configuration of the reference block.

For detecting a motion vector, a predetermined search block of the pixel data within the search area is compared with the pixel data of the reference block. The reference block is, as illustrated in FIG. 4, formed of, for example, 4×4 pixels, and is supplied to a memory 31 and stored therein. Accordingly, the search block is also formed of 4×4 pixels.

Figure 3:
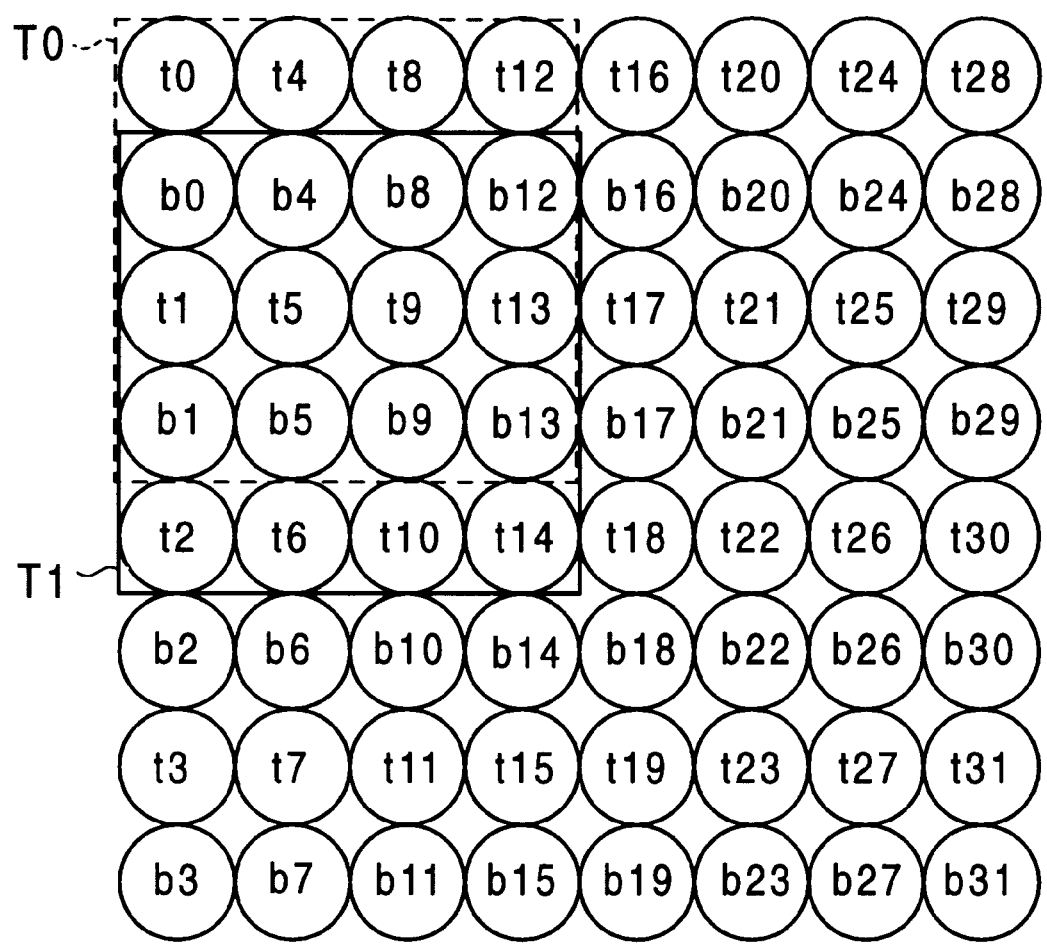
FIG. 3 illustrates the search area.

FIGS. 3 and 4 only partially illustrate the pixel data for one frame consisting of a top field and a bottom field.

The pixel data indicated by t represents top field pixel data, while the pixel data indicated by b represents bottom field pixel data.

In this embodiment, a motion vector is detected according to the 2:1 sub-sampling method. Thus, among the reference block pixel data consisting of 4×4 pixels, the pixel data used for detecting a motion vector is only half the reference block, i.e., eight pixels. In this embodiment, the interleaved pixel data is used, as shown in FIG. 4, for detecting a motion vector. The pixel data items of every other column in the vertical direction (pixel data items indicated by black portions in FIG. 4), and more specifically, the pixel data t(0,0), b(0,0), t(1,0), and b(1,0) of the first column from the left, and the pixel data t(0,2), b(0,2), t(1,2), and b(1,2) of the third column from the left, are used.

Figure 5:
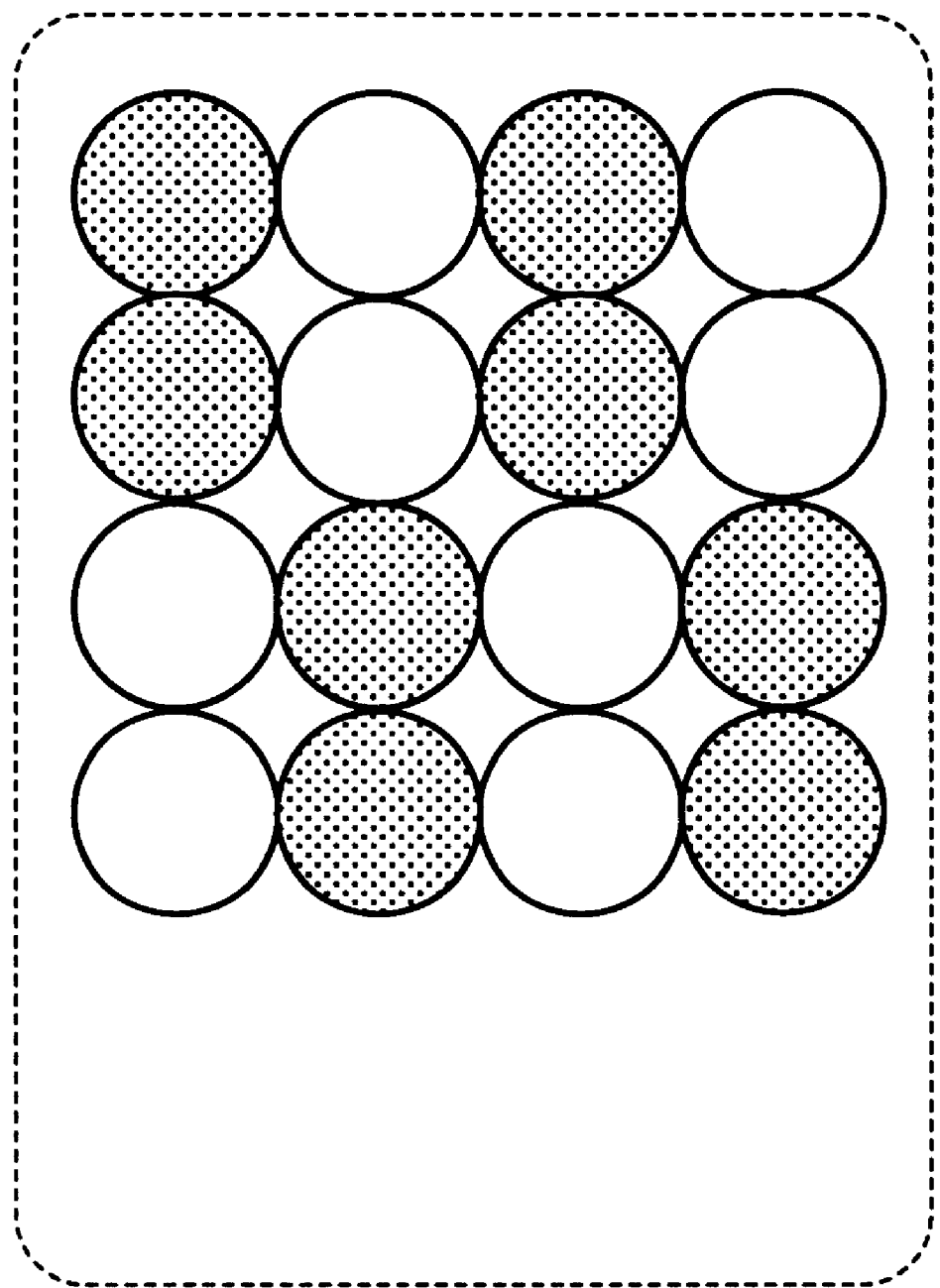
FIG. 5 illustrates another example of the configuration of the reference block.

Alternatively, the following modification shown in FIG. 5 is theoretically possible. Among the 4×4 pixels, the upper half or the lower half of the pixels of each column may be alternately extracted and used for detecting a motion vector.

In this modification, however, the pixels do not interleave with each other, thereby failing to exhibit the advantage of the invention, i.e., the transferring of pixel data cannot be suppressed. Accordingly, the interleaved eight pixels, such as those shown in FIG. 4, are used as the reference data.

It is possible to store all the 4×4 pixels, which form the reference block, in the memory 31. It is sufficient, however, to store only eight pixels used for detecting a motion vector. It is now assumed that the interleaved eight pixels, such as those shown in FIG. 4, are used as the reference data.

Referring back to FIG. 2, a selector 45 reads four pixels from each of the storage units 41 through 44 and supplies them to the corresponding subtracters 46 through 53. Also appropriately supplied to each of the subtracters 46 through 53 from the memory 31 is one of the pixels of the reference block. The subtracters 46 through 53 each subtract the pixel data input from the memory 31 from the pixel data input from the selector 45 to obtain the absolute value of the difference. The outputs of the subtracters 46 through 49 are input into an adder 54 and added, while the outputs of the subtracters 50 through 53 are input into an adder 55 and added. The output of the adder 54 and the output of the adder 55 are input into an adder 34 and further added. The outputs of the individual adders 54, 55, and 34 are input into a minimum value detecting circuit 35. The minimum value detecting circuit 35 then determines which search block has the minimum data among the input data and outputs a residual (motion vector) corresponding to the search block.

A calculating circuit 32, which is formed of the storage units 41 and 42, the selector 45, the subtracters 46 through 49, and the adder 54 calculates top field pixel data. A calculating circuit 33, which is formed of the storage units 43 and 44, the selector 45, the subtracters 50 through 53, and the adder 55, calculates bottom field pixel data.

The operation of the above-described motion vector detecting circuit 11 is now described. In this embodiment, as illustrated in FIG. 3, among the 8×8 pixels of the search area, the 4×4 pixels on the upper left are first extracted as a search block. Then, the difference is obtained between each of the eight pixels of the reference data stored in the memory 31 and each of the eight pixels of the search block placed at the positions corresponding to the eight pixels of the reference data. The sum of the absolute values of the obtained respective differences is determined as a residual of the search block.

Subsequently, the search block is shifted downward by one pixel. Namely, the block surrounded by the broken lines is shifted, as shown in FIG. 3, to the block surrounded by the solid lines. Then, a residual of this search block is also calculated. When the search block has been shifted to the lowermost position of the search area, it is again shifted to the uppermost position of the search area and is also displaced rightward by one pixel. Thereafter, the foregoing processing is similarly repeated. Finally, among the residuals of the respective search blocks, the data indicating the position of the search block having the minimum residual is determined to be a motion vector.

Figure 6:
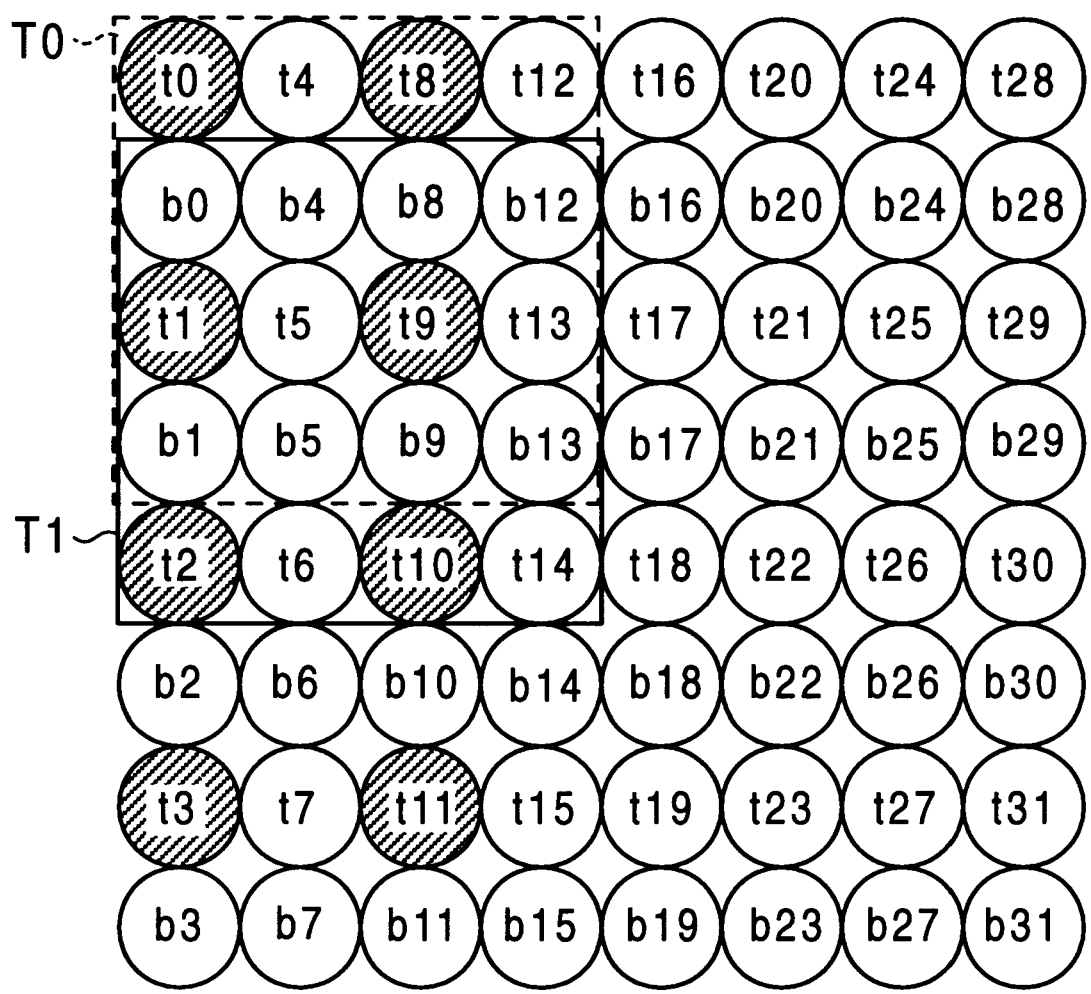
FIG. 6 illustrates the pixel data to be stored in a storage unit shown in FIG. 2.

The foregoing processing is described more specifically. The pixel data items t0 through t3 and the pixel data items t8 through t11 illustrated in FIG. 3 are first supplied as the search area data from a memory (not shown) to the storage unit 41 and stored therein. Namely, the pixel data items indicated by the black portions shown in FIG. 6 are stored in the storage unit 41.

Figure 7:
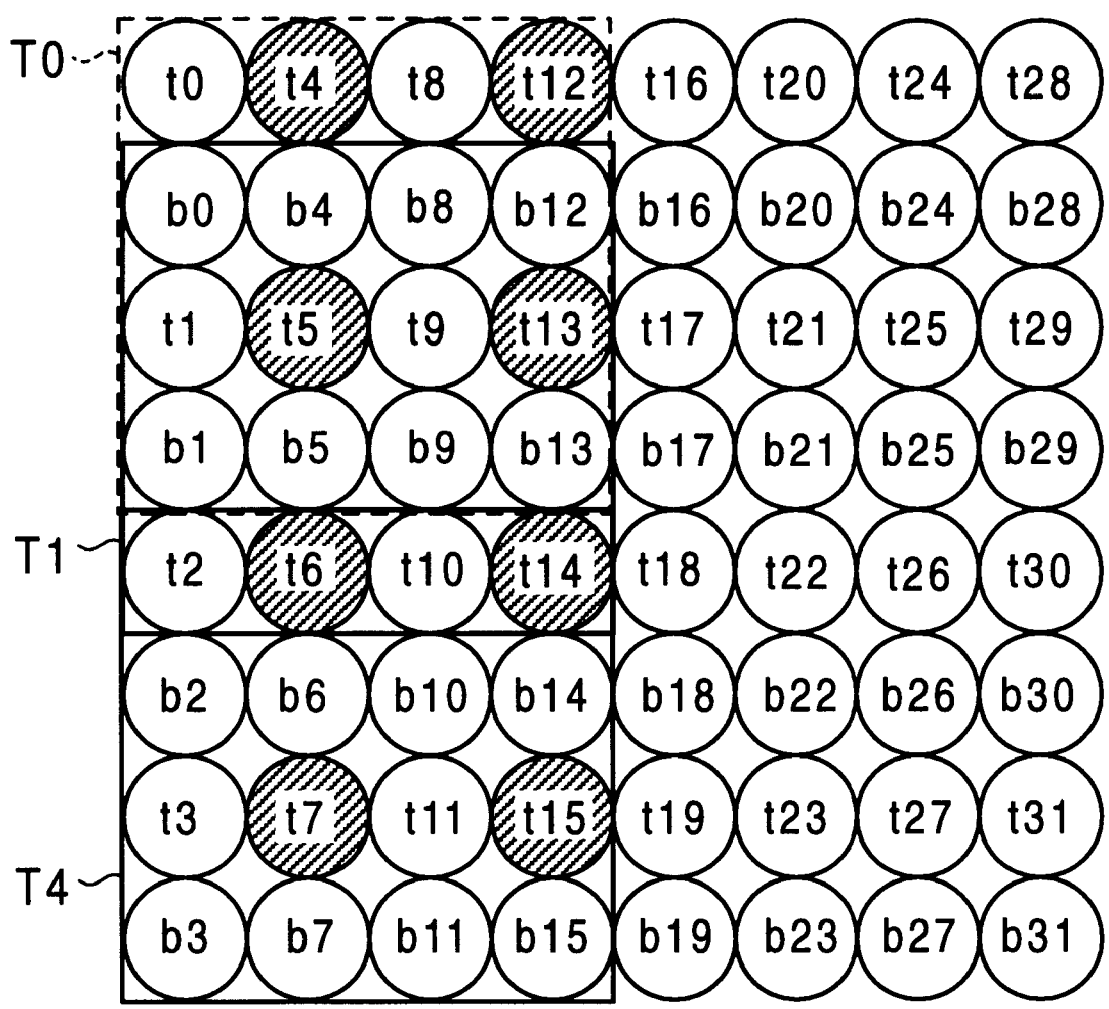
FIG. 7 illustrates the pixel data to be stored in another storage unit shown in FIG. 2.
Figure 8:
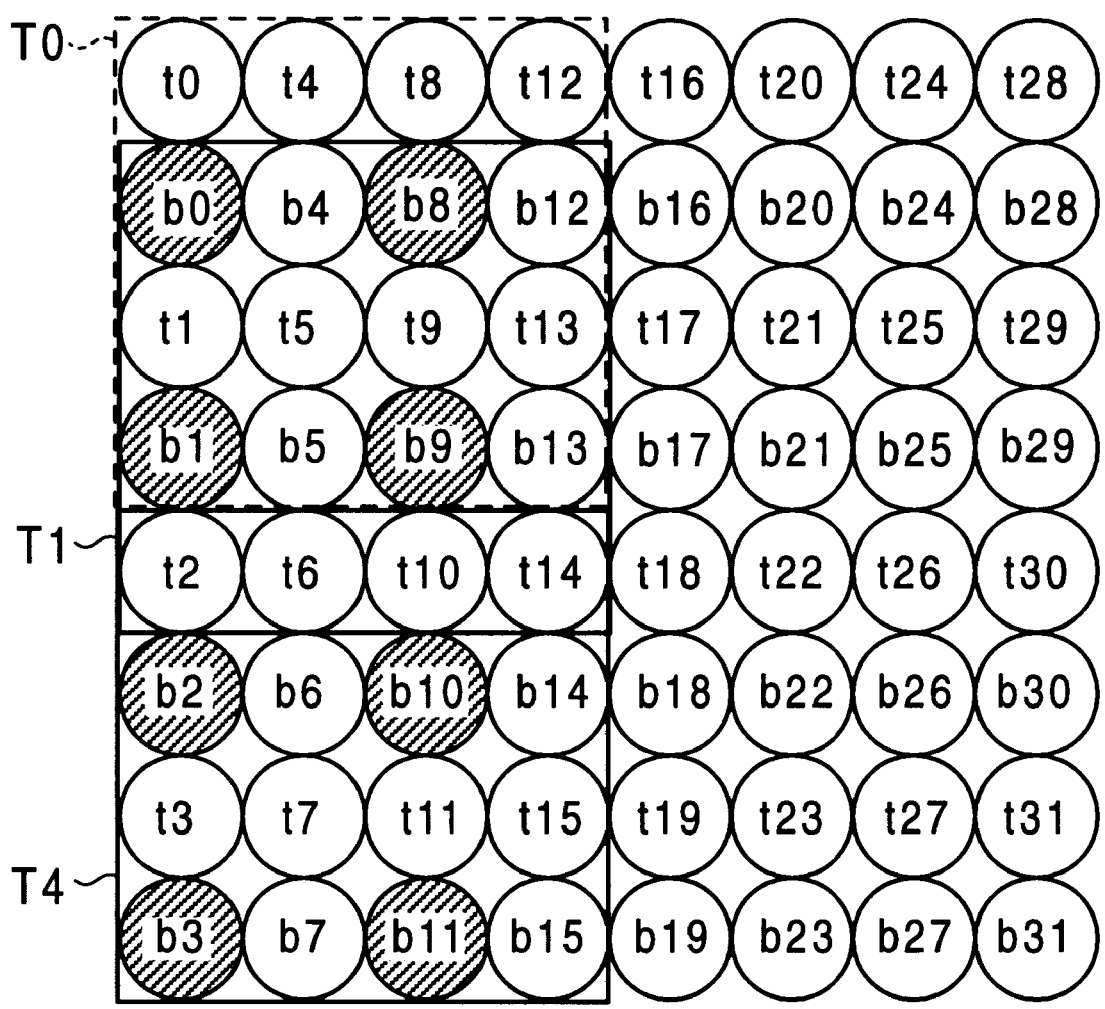
FIG. 8 illustrates the pixel data to be stored in still another storage unit shown in FIG. 2.
Figure 9:
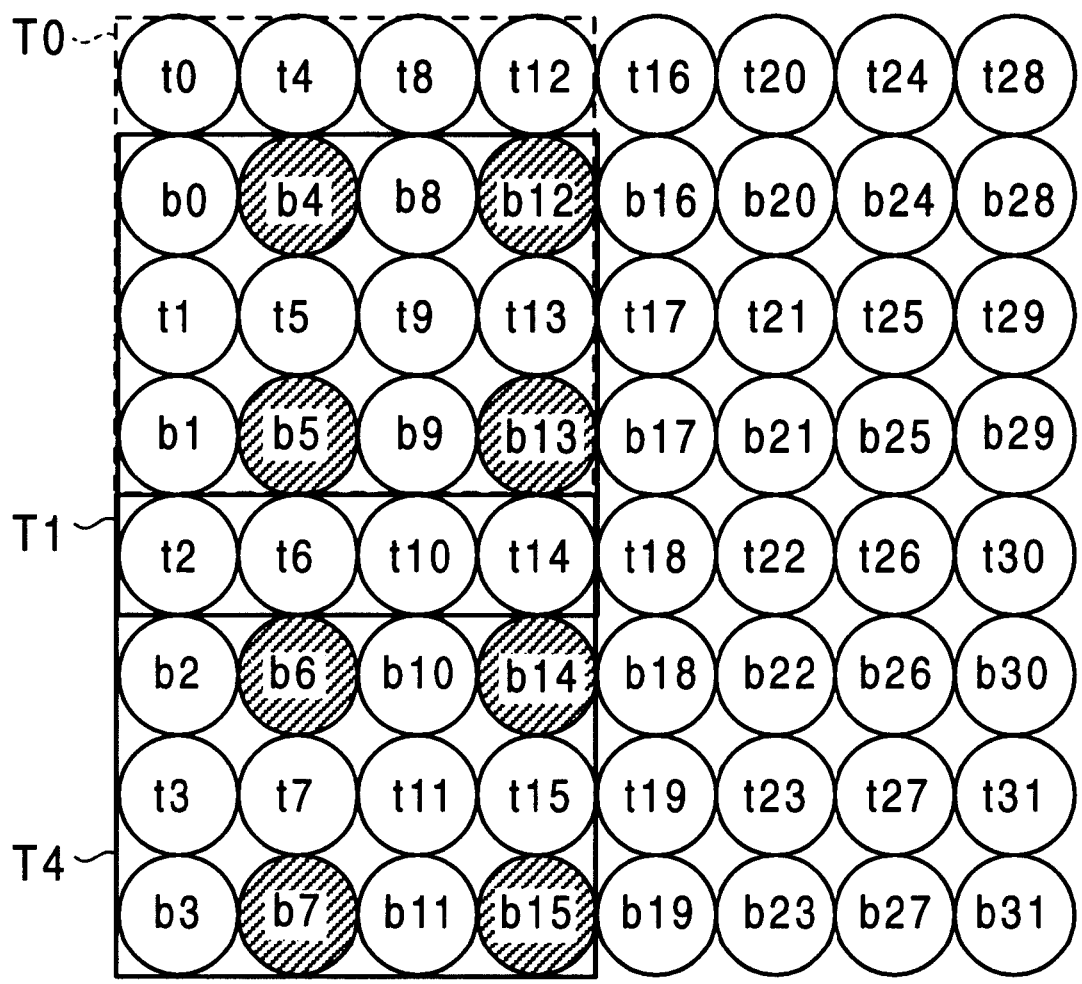
FIG. 9 illustrates the pixel data to be stored in a further storage unit shown in FIG. 2.

Likewise, the pixel data items t4 through t7 and the pixel data items t12 through t15 are stored, as illustrated in FIG. 7, in the storage unit 42. The pixel data items b0 through b3 and the pixel data items b8 through b11 are stored, as shown in FIG. 8, in the storage unit 43. Further, the pixel data items b4 through b7 and the pixel data items b12 through b15 are stored, as illustrated in FIG. 9, in the storage unit 44.

The selector 45 supplies the pixel data stored in the storage units 41 through 44 to the subtracters 46 through 53 at time Ti, as shown in FIG. 10.

More specifically, at time T0, the selector 45 selects pixel data items t0, t1, t8, and t9 from the pixel data t0 through t3 and t8 through t11 stored in the storage unit 41 and supplies them to the subtracters 46 through 49, respectively. Also supplied to the subtracters 46 through 49 from the memory 31 are image data t(0,0), t(1,0), t(0,2), and t(1,2), respectively, shown in FIG. 4. Accordingly, the subtracter 46 performs a calculation to obtain the absolute value abs (t(0,0)−t0) of the difference (t(0,0)−t0) between the pixel data t(0,0) and the pixel data t0. Likewise, the subtracters 47 through 49 respectively perform calculations to obtain the absolute values abs (t(1,0)−t1), abs (t(0,2)−t8), and abs (t(1,2)−t9).

The adder 54 then adds the outputs of the respective subtracters 46 through 49, as represented by the following expression.

$$abs(t(0,0)-t0)+abs(t(1,0)-t1)+abs(t(0,2)-t8)+abs(t(1,2)-t9)$$

Meanwhile, the selector 45 selects the pixel data items b0, b1, b8, and b9 from the pixel data b0 through b3 and b8 through b11 stored in the storage unit 43 and supplies them to the subtracters 50 through 53, respectively. Also supplied to the subtracters 50 through 53 from the memory 31 are pixel data b(0,0), b(1,0), b(0,2), and b(0,1), respectively. Accordingly, the subtracters 50 through 53 respectively perform calculations to obtain the absolute values abs (b(0,0)−b0), abs (b(1,0)−b1), abs (b(0,2)−b8), and abs (b(0,1)−b9). Then, the adder 55 adds the outputs of the respective subtracters 50 through 53, as represented by the following expression.

$$abs(b(0,0)-b0)+abs(b(1,0)-b1)+abs(b(0,2)-b8)+abs(b(1,2)-b9)$$

The output of the adder 54 indicates the data Dtt of the absolute value of the difference between the top field pixel data stored in the memory 31 and the top field pixel data stored in the storage unit 41. The output of the adder 55 represents the data Dbb of the absolute value of the difference between the bottom field pixel data stored in the memory 31 and the bottom field pixel data stored in the storage unit 43. The output Dtt of the adder 54 and the output Dbb of the adder 55 are further added in the adder 34, and the added value is determined as the predictive frame residual Dfr.

The minimum value detecting circuit 35 determines the minimum residual from the outputs of the adders 54, 55, and 34.

Subsequently, at time T1, the selector 45 selects pixel data b0, b1, b8, and b9 stored in the storage unit 43 and supplies them to the subtracters 46 through 49, respectively.

Further, pixel data t1, t2, t9, and t10 stored in the storage unit 41 are read and supplied to the subtracters 50 through 53, respectively. Also supplied to the subtracters 46 through 53 from the memory 31 are the same pixel data as those fed to the subtracters 46 through 53 at time T0. Thus, the subtracters 46 through 49 perform calculations to obtain abs (t(0,0)−b0), abs (t(1,0)−b1), abs (t(0,2)−b8), and abs (t(0,1)−b9), respectively, while the subtracters 50 through 53 perform calculations to obtain abs (b(0,0)−t1), abs (b(1,0)−t2), abs (b(0,2)−t9), and abs (b(0,1)−t10), respectively.

Then, the adder 54 adds the outputs of the respective subtracters 46 through 49, as represented by the following expression.

$$abs(t(0,0)-b0)+abs(t(1,0)-b1)+abs(t(0,2)-b8)+abs(t(1,2)-b9)$$

Moreover, the adder 55 adds the outputs of the respective subtracters 50 through 53, as represented by the following expression.

$$abs(b(0,0)-t1)+abs(b(1,0)-t2)+abs(b(0,2)-t9)+abs(b(1,2)-t10)$$

The adder 34 then adds the output of the adder 54 and the output of the adder 55. Moreover, the minimum value detecting circuit 35 determines the minimum value from the outputs of the adders 54, 55, and 34, and further compares the minimum value T1 with the previously obtained minimum value T0, thereby determining the smaller value of the two as the final minimum value.

Similarly, the foregoing processing is sequentially repeated at time T2, T3, and T4. At each time T1, T2, T3, and T4, the search block is shifted downward by each pixel from the upper left of the search data, as shown in FIG. 3, and finally reaches the lowermost position of the search data at time T4.

Thereafter, at time T5, the selector 45 selects the pixel data items t4, t5, t12, and t13 from the pixel data t4 through t7 and t12 through t15 stored in the storage unit 42 and supplies them to the subtracters 46 through 49, respectively. The selector 45 also selects the pixel data items b4, b5, b12, and b13 from the pixel data b4 through b7 and b12 through b15 stored in the storage unit 44 and supplies them to the subtracters 50 through 53, respectively. Accordingly, the subtracters 46 through 49 perform calculations to obtain abs (t(0,0)-t4), abs (t(1,0)-t5), abs (t(0,2)-t12), and abs (t(0,1)-t13), respectively. Moreover, the subtracters 50 through 53 perform calculations to obtain abs (b(0,0)-b4), abs (b(1,0)-b5), abs (b(0,2)-b12), and abs (b(0,1)-b13), respectively.

Then, the adder 54 adds the outputs of the respective subtracters 46 through 49, while the adder 55 adds the outputs of the respective subtracters 50 through 53. Further, the adder 34 adds the output of the adder 54 and the output of the adder 55. Subsequently, the minimum value detecting circuit 35 determines the minimum value from the outputs of the adders 54, 55, and 34, and further compares it with the previously determined minimum values, thereby determining the smaller value as the final minimum value. Namely, according to the above-described calculations, the residual between the search block defined by the broken lines shown in FIG. 3 and the search block shifted rightward by one pixel is determined.

Thereafter, similarly, as illustrated in FIG. 10, the selector 45 suitably selects the pixel data stored in the storage units 41 through 44 and supplies them to the subtracters 46 through 53, thereby performing calculations.

Figure 11:
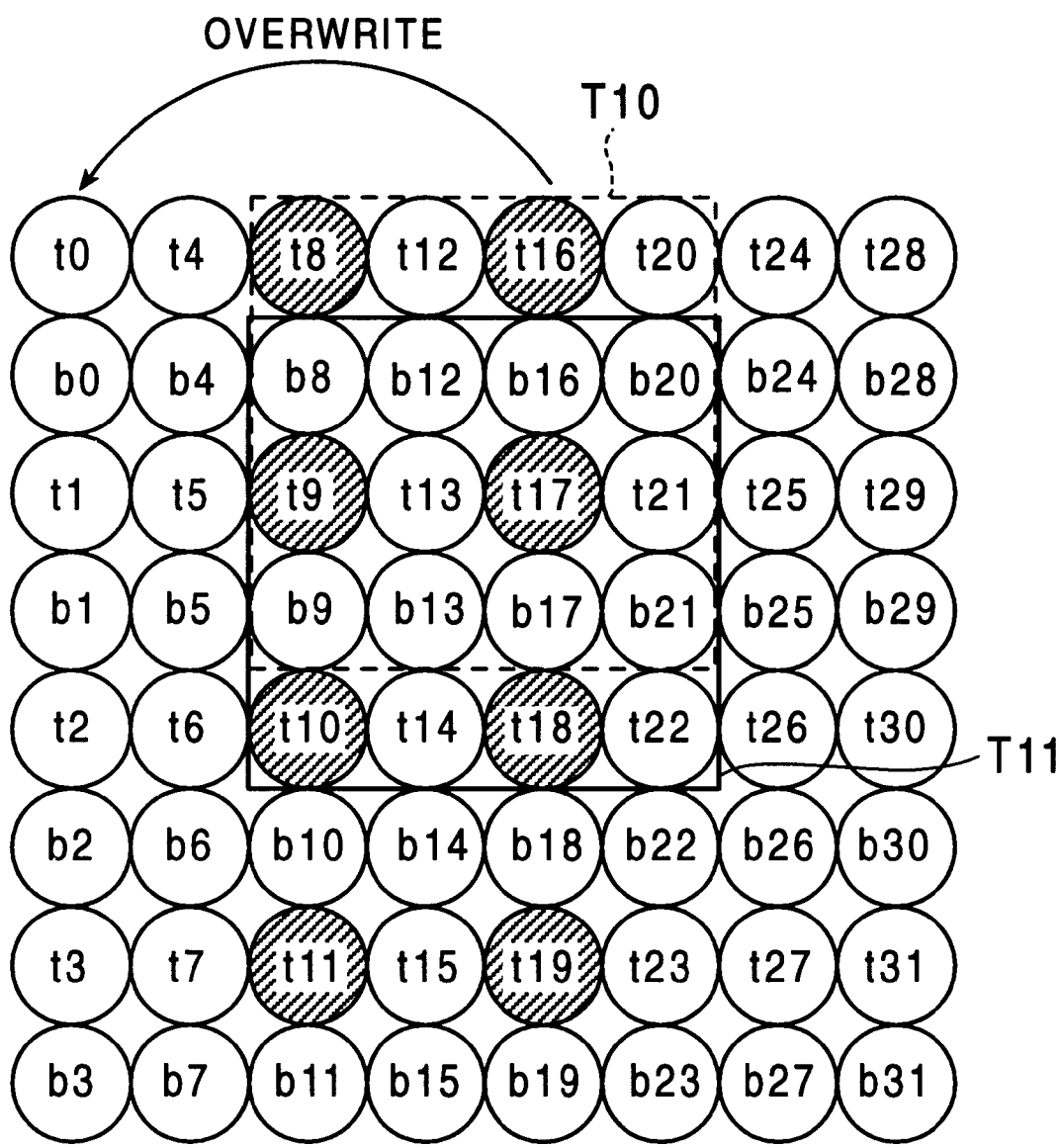
FIG. 11 illustrates the updating of the pixel data in the storage unit shown in FIG. 6.

At time T0 through T4, the storage units 41 and 43 are used, while at time T5 through T9, the storage units 42 and 44 are used. While the storage units are not in use, the pixel data that will be required subsequently is written into the same units. More specifically, the pixel data t0, t1, t2, and t3 are respectively overwritten, as shown in FIG. 11, with new pixel data t16, t17, t18, and t19. As a consequence, the pixel data t8 through t11 and t16 through t19 are newly stored in the storage unit 41.

Figure 12:
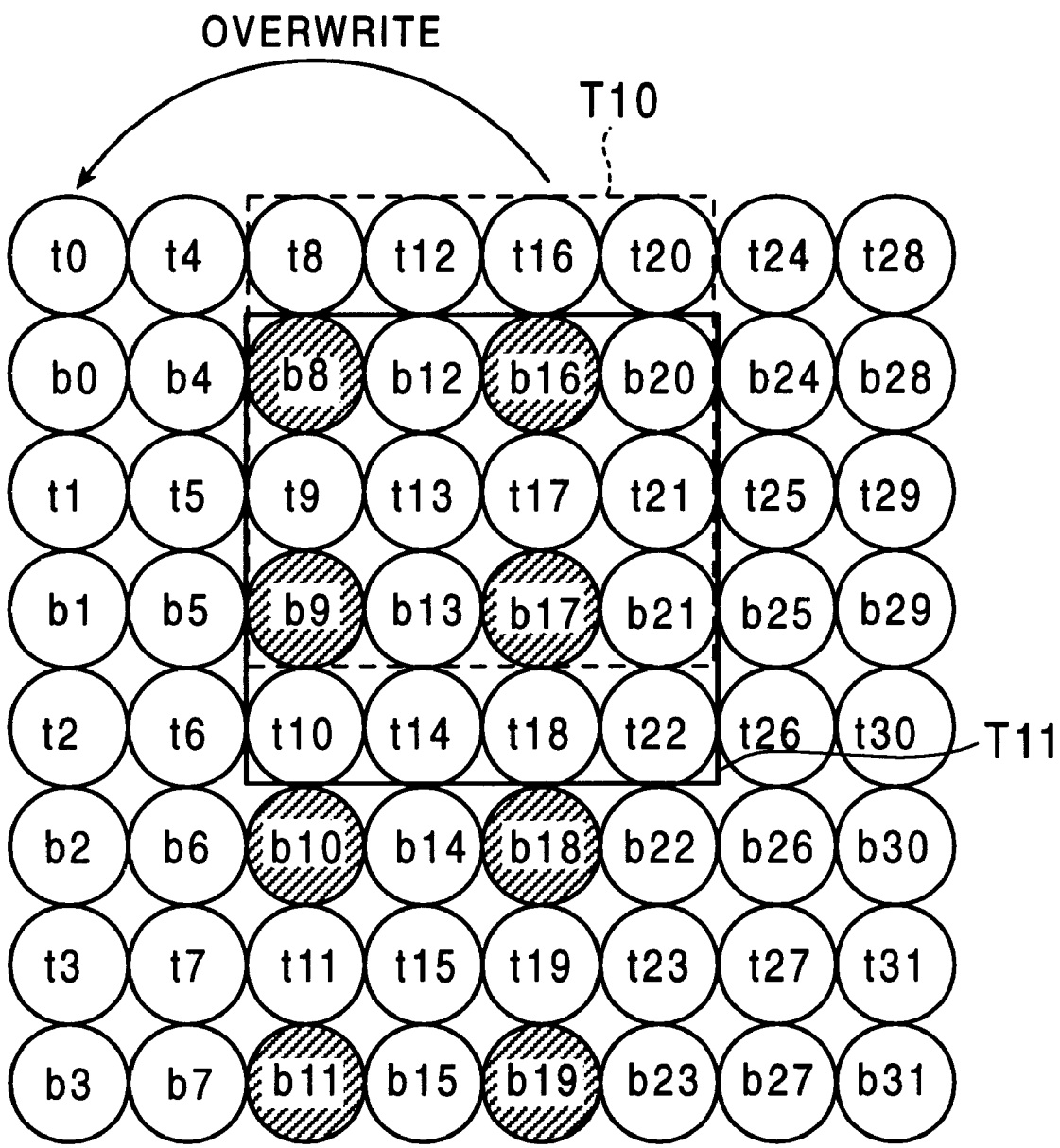
FIG. 12 illustrates the updating of the pixel data in the storage unit shown in FIG. 8.

Likewise, the pixel data b0 through b3 are overwritten, as illustrated in FIG. 12, with new pixel data b16 through b19 in the storage unit 43. As a result, the pixel data b8 through b11 and b16 through b19 are newly stored in the storage unit 43.

Figure 13:
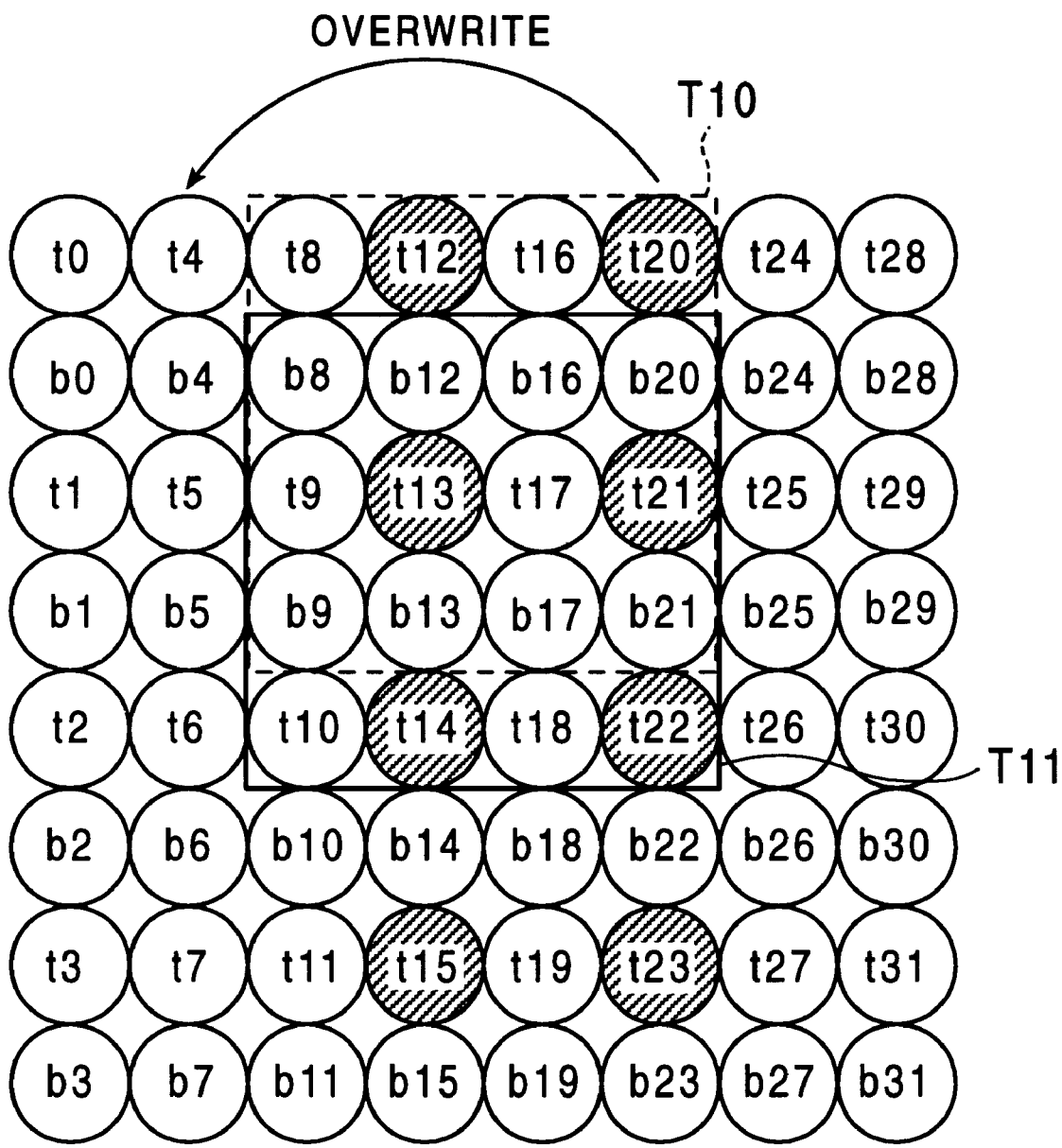
FIG. 13 illustrates the updating of the pixel data in the storage unit shown in FIG. 7.

Thereafter, similarly, the storage units 41 and 43 are used at time t10 through t14, while the storage units 42 and 44 are not in use. Accordingly, new pixel data is written into the storage units 42 and 44. More specifically, the pixel data t4 through t7 are overwritten, as illustrated in FIG. 13, with new pixel data t20 through t23. Hence, the pixel data t12 through t15 and t20 through t23 are newly stored in the storage unit 42.

Figure 14:
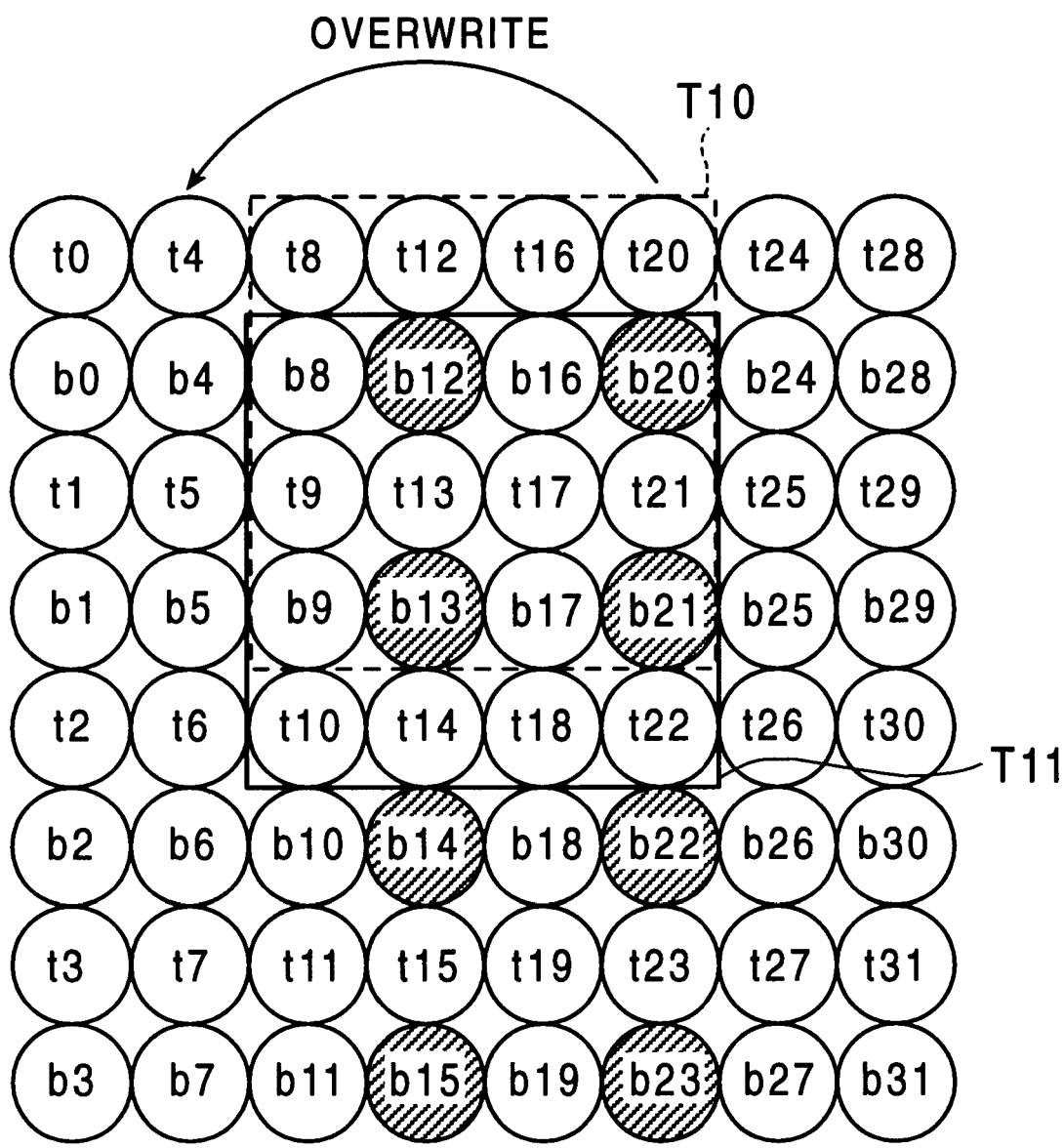
FIG. 14 illustrates the updating of the pixel data in the storage unit shown in FIG. 9.

Likewise, the pixel data b4 through b7 are overwritten, as shown in FIG. 14, with new pixel data b20 through b23 in the storage unit 44. Consequently, the pixel data b12 through b15 and b20 through b23 are newly stored in the storage unit 44.

In this manner, the search block is shifted within the search area which consists of the 8×8 pixels, as shown in FIG. 3, thereby determining the residual between the pixel data of the search block at each shifting position and pixel data of the reference block stored in the memory 31. Then, the position of the search block having the minimum residual within the search area is output from the minimum value detecting circuit 35 as the motion vector.

For example, the motion vector MV(mvx, mvy) corresponding to the search block at time T0 defined by the broken lines shown in FIG. 3 is (−2, −2). The motion vector corresponding to the search block at time T1 represented by the solid lines shown in FIG. 3 is (−2, −1). The motion vector corresponding to the search block at time T4 is (−2, +2), and the motion vector corresponding to the search block at time T5 is (−1, −2).

In this embodiment, the absolute values of the differences are determined in the subtracters 46 through 53. However, the sum of the squares of the differences may be obtained.

Moreover, although in the foregoing embodiment the pixel columns are used to interleave pixels in the horizontal direction, the pixel rows may be used to interleave pixels in the vertical direction.

According to the foregoing description, pixel columns to be searched are interleaved, which makes it possible to update the pixel columns which are not being searched. Moreover, pipeline processing is not required for transfer pixel data. As a result, the flow of a current incidental to the transferring of pixel data is reduced, thereby inhibiting the consumption of a large amount of power.

As is seen from the foregoing description, according to the apparatus and the method for detecting motion vectors of the present invention, among the pixel data of the reference block, the interleaved pixel data is used to perform calculations. This makes it possible to eliminate pipeline processing for transferring search data and to reduce the power consumption.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A motion vector detecting apparatus, comprising:
 a first storage unit for storing a portion of top-field pixel data, said portion including only pixels of either the odd-numbered rows or odd-numbered columns of a search area within said top-field;
 a second storage unit for storing a portion of top-field pixel data, said portion including only pixels of either the even-numbered rows or even-numbered columns of a search area within said top-field;

a third storage unit for storing a portion of bottom-field pixel data, said portion including only pixels of either the odd-numbered rows or odd-numbered columns of a search area within said bottom-field;

a fourth storage unit for storing a portion of bottom-field pixel data, said portion including only pixels of either the even-numbered rows or even-numbered columns of a search area within said bottom-field;

a fifth storage unit for storing at least interleaved pixel data among pixel data of a reference block;

a selector for selecting pixel data of a predetermined search block from among the pixel data stored in said first storage unit through said fourth storage unit;

a first calculator for performing a calculation to obtain a difference between each pixel of the pixel data of the search block selected by said selector and each corresponding pixel of the pixel data of the reference block stored in said fifth storage unit, thereby generating a plurality of pixel differences;

a second calculator for performing a calculation to obtain a sum of the pixel differences obtained by said first calculator; and a detector for detecting a search block corresponding to a minimum value of the calculation performed by said second calculator when said calculations of said first and second calculator are performed for a plurality of predetermined search blocks selected by said selector.

2. A motion vector detecting apparatus according to claim 1, wherein the pixel data of said reference block used for the calculation by said first calculator comprises interleaved pixel data in the horizontal direction or the vertical direction.

3. A motion vector detecting apparatus according to claim 1, wherein each of said first storage unit through said fourth storage unit overwrites the pixel data within the search area with new pixel data and stores it in a case where the pixel data stored in the corresponding storage units are not in use.

4. A motion vector detecting apparatus according to claim 1, wherein said first calculator performs a calculation to obtain an absolute value or a square of the difference between the pixel data of the search block selected by said selector and the pixel data of the reference block stored in said fifth storage unit.

5. A motion vector detecting method, comprising the steps of:

storing in a first storage unit a portion of top-field pixel data, said portion including only pixels of either the odd-numbered rows or odd-numbered columns of a search area within said top-field;

storing in a second storage unit a portion of top-field pixel data, said portion including only pixels of either the even-numbered rows or even-numbered columns of a search area within said top-field;

storing in a third storage unit a portion of bottom-field pixel data, said portion including only pixels of either the odd-numbered rows or odd-numbered columns of a search area within said bottom-field;

storing in a fourth storage unit a portion of bottom-field pixel data, said portion including only pixels of either the even-numbered rows or even-numbered columns of a search area within said bottom-field;

storing in a fifth storage unit at least interleaved pixel data among pixel data of a reference block;

selecting pixel data of a predetermined search block from among the pixel data stored in said first storage unit through said fourth storage unit;

performing a first calculation to obtain a difference between each pixel of the pixel data of the selected search block and each corresponding pixel of the pixel data of the reference block stored in said fifth storage unit, thereby generating a plurality of pixel differences;

performing a second calculation to obtain a sum of the pixel differences obtained through said first calculation; and repeating for each of a plurality of predetermined search blocks said steps of selecting pixel data of a predetermined search block, performing a first calculation performing a second calculation and detecting a search block corresponding to a minimum value obtained through said second calculation.

6. A motion vector detecting method according to claim 5, wherein the pixel data of said reference block used for the calculation by said first calculation step comprises interleaved pixel data in the horizontal direction or the vertical direction.

7. A motion vector detecting method according to claim 5, wherein each of said first storage unit through said fourth storage unit overwrites the pixel data within the search area with new pixel data and stores it in a case where the pixel data stored in the corresponding storage units are not in use.

8. A motion vector detecting method according to claim 5, wherein said first calculation step performs a calculation to obtain an absolute value or a square of the difference between the pixel data of the search block selected by said selection step and the pixel data of the reference block stored in said fifth storage unit.

* * * * *